(12) United States Patent
Wang et al.

(10) Patent No.: US 10,285,229 B2
(45) Date of Patent: May 7, 2019

(54) LED DRIVING CIRCUIT HAVING SCR DIMMER, CIRCUIT MODULE AND CONTROL METHOD THEREOF

(71) Applicant: Silergy Semiconductor Technology (Hangzhou) LTD, Hangzhou, ZheJiang Province (CN)

(72) Inventors: Jianxin Wang, Hangzhou (CN); Huiqiang Chen, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 15/935,239

(22) Filed: Mar. 26, 2018

(65) Prior Publication Data

US 2018/0295685 A1    Oct. 11, 2018

(30) Foreign Application Priority Data

Apr. 6, 2017 (CN) .......................... 2017 1 0219939

(51) Int. Cl.
*H05B 33/08* (2006.01)

(52) U.S. Cl.
CPC ..... *H05B 33/0815* (2013.01); *H05B 33/0809* (2013.01); *H05B 33/0845* (2013.01)

(58) Field of Classification Search
CPC ............... H05B 33/08; H05B 33/0809; H05B 33/0815; H05B 33/0824; H05B 33/0842; H05B 33/0845
See application file for complete search history.

(56) References Cited

U.S. PATENT DOCUMENTS

| | | | |
|---|---|---|---|
| 8,552,942 B2 * | 10/2013 | Hua | H05B 33/0815 345/77 |
| 8,581,518 B2 * | 11/2013 | Kuang | H05B 33/0845 315/185 R |
| 8,614,551 B2 | 12/2013 | Chen et al. | |
| 9,125,270 B2 | 9/2015 | Liao et al. | |
| 9,307,593 B1 * | 4/2016 | Wang | H05B 33/0818 |
| 9,578,706 B1 | 2/2017 | Lai et al. | |
| 2011/0127925 A1 * | 6/2011 | Huang | H05B 37/0263 315/287 |
| 2012/0104970 A1 * | 5/2012 | Okubo | H05B 33/0887 315/291 |
| 2013/0241427 A1 * | 9/2013 | Kesterson | H05B 37/02 315/210 |
| 2014/0062322 A1 * | 3/2014 | Yu | H05B 33/0851 315/200 R |
| 2015/0366018 A1 * | 12/2015 | Kuang | H05B 33/0848 315/206 |

* cited by examiner

*Primary Examiner* — Thai Pham
(74) *Attorney, Agent, or Firm* — Michael C. Stephens, Jr.

(57) ABSTRACT

An apparatus can include: a bleeder circuit coupled to a DC bus of an LED driving circuit having an SCR dimmer; the bleeder circuit being configured to stabilize a voltage of the DC bus at a predetermined value by drawing a bleed current through a bleed path in a first mode, and to cut off the bleed path in a second mode; and a controller configured to control the bleeder circuit to be in the first mode before the SCR dimmer is turned on, and to switch to the second mode after the SCR dimmer is turned on, where the predetermined value is greater than zero.

20 Claims, 12 Drawing Sheets

LED DRIVING CIRCUIT HAVING SCR DIMMER, CIRCUIT MODULE AND CONTROL METHOD THEREOF

RELATED APPLICATIONS

This application claims the benefit of Chinese Patent Application No. 201710219939.0, filed on Apr. 6, 2017, which is incorporated herein by reference in its entirety.

FIELD OF THE INVENTION

The present invention generally relates to the field of power electronics, and more particularly to an LED driver with a silicon-controlled dimmer, along with associated circuits and methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Figure 1:
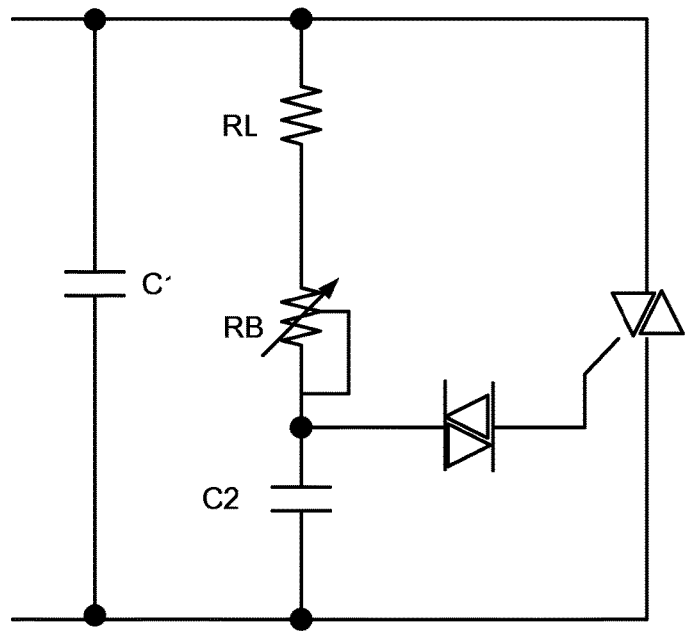
FIG. 1 is a schematic block diagram of an example SCR dimmer.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A silicon-controlled rectifier (SCR) dimmer is commonly used for dimming control. By utilizing phase control to achieve dimming, the SCR dimmer can be controlled to be turned on during every half cycle of the sine wave, in order to get a conduction angle. The conduction angle can be regulated by adjusting the chopper phase of the SCR dimmer to achieve dimming. The SCR dimmer has previously been used for incandescent lamp to control dimming. With the popularity of light-emitting diode (LED) light, increasingly LED driving circuits utilize SCR dimmers to control dimming of the LED light. Typically, the SCR dimmer may be utilized in conjunction with a linear constant current control scheme. The linear constant current control scheme can control a current flowing through an LED load to be constant by controlling a linear device (e.g., a transistor operating in a linear region/mode) that is substantially in series with at least one portion of the LED load.

There are several different variations of linear constant current control scheme, such as all the LED loads being controlled through a linear device to achieve constant current control, or the LED loads being grouped, whereby a corresponding one linear device is arranged for each group to achieve constant current control. For different linear constant current control schemes, different load driving voltages may be required. Therefore, when a driving circuit with an SCR dimmer is utilized to drive an LED load, a driving voltage when the SCR dimmer is turned on may not be available for the LED load. Furthermore, a leakage current may unavoidable before the SCR dimmer is turned on depending on the types of the SCR dimmer and the parameters of the LED driving circuit. Because the leakage current may vary along with the parameters and types of SCR dimmers, the conduction angle may correspondingly vary. As a result, an error between the ideal conduction angle and a real conduction angle may occur, which can cause flickering of the LED load.

Referring now to FIG. 1, shown is a schematic block diagram of an example SCR dimmer. An AC path can charge capacitor C2 through resistor RL and resistor RB when the SCR dimmer is not turned on. The condition for the SCR dimmer is that the voltage across capacitor C2 reaches the conduction threshold, and the conduction point of the SCR dimmer can be regulated by adjusting resistance RB. Due to current charging capacitor C2 during turning off of the SCR dimmer, the SCR dimmer may have a leakage current, and the leakage current can also be formed in capacitor C1 due to the voltage difference across the two terminals of capacitor C1. As discussed above, the presence of such a leakage current can cause the conduction angle of the SCR dimmer to be indefinite, thereby causing the LED load to flicker.

Figure 2:
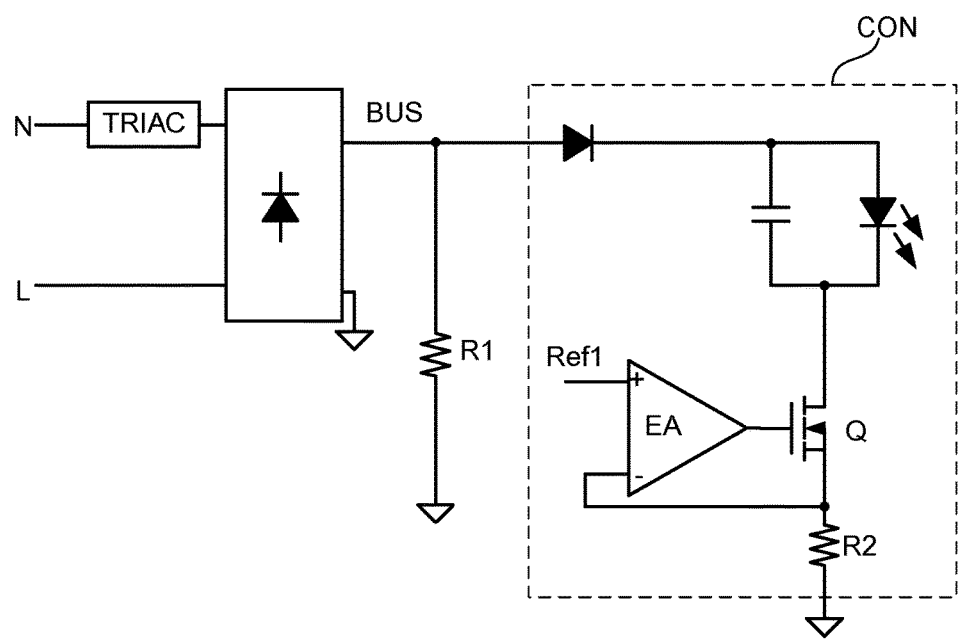
FIG. 2 is a schematic block diagram of an example LED driving circuit.

Referring now to FIG. 2, shown is a schematic block diagram of an example LED driving circuit. The leakage current can be resolved according to this example. This example LED driving circuit can include SCR dimmer TRIAC, a rectifier circuit, constant current control circuit CON, and bleed resistor R1. SCR dimmer TRIAC can connect between an AC input terminal and the rectifier circuit for chopping an AC input voltage. The rectifier circuit can convert alternating current voltage to direct current voltage. Constant current control circuit CON can integrate an LED load and regulate a load current flowing through the LED load through transistor Q. In addition, load current sampling signal Ref1 can be sampled by resistor R2 coupled in series with transistor Q and fed back to error amplifier EA. Error amplifier EA can achieve constant current control for transistor Q according to load current reference signal Ref1 and load current sampling signal Ref1. Bleed resistor R1 can connect between DC bus voltage BUS and ground for drawing a leakage current of SCR dimmer TRIAC, in order to prevent DC bus voltage VBUS from varying with the AC input voltage due to the leakage current, and to prevent a voltage difference on SCR dimmer TRIAC from being reduced. In this way, delay of the turn-on operation of SCR dimmer can be avoided and dimming with full brightness can also be achieved.

Figure 3:
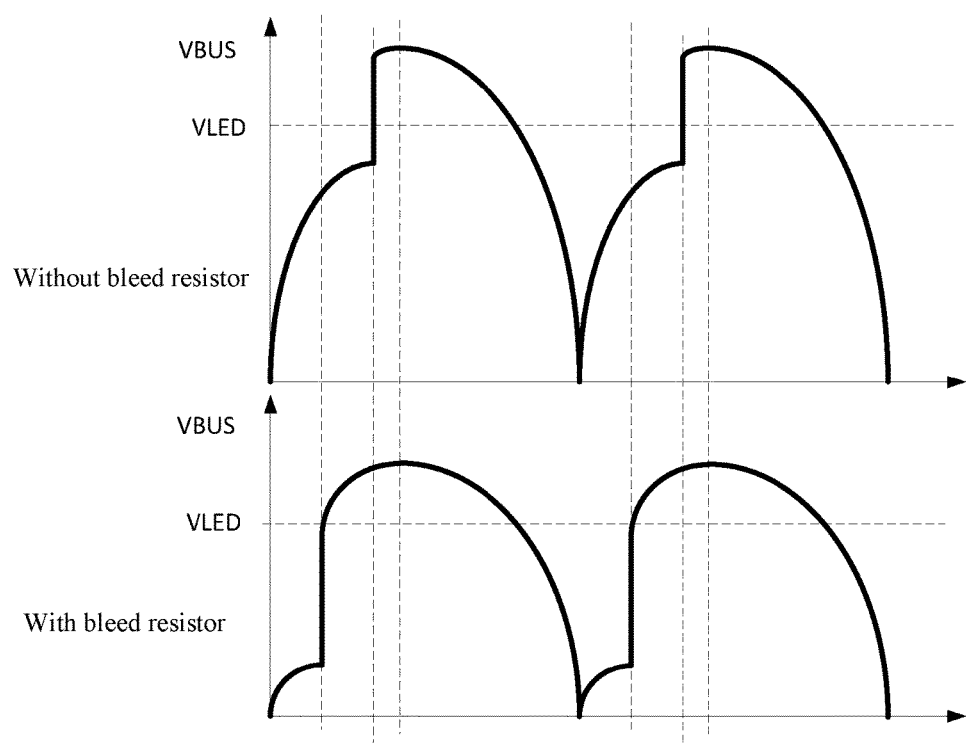
FIG. 3 is a waveform diagram of example operation of the circuit of FIG. 2.

Referring now to FIG. 3, shown is a waveform diagram of example operation of the circuit of FIG. 2. The turn-on time of SCR dimmer TRIAC may be delayed without bleed resistor R1, and DC bus voltage VBUS can be higher before SCR dimmer TRIAC is turned on. Also, DC bus voltage VBUS can be greater than a load driving voltage after SCR dimmer TRIAC is turned on. The conduction time of SCR dimmer TRIAC can be advanced with bleed resistor R1, in order to reduce losses when SCR dimmer is off. However, bleed resistor R1 can introduce additional losses and lead to decreased efficiency in some cases.

Figure 4:
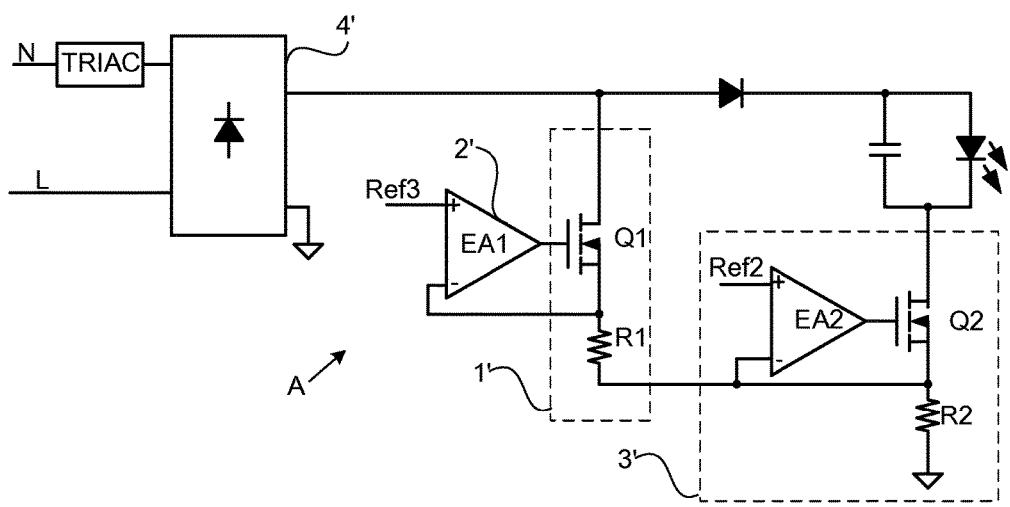
FIG. 4 is a schematic block diagram of another example LED driving circuit.

Referring now to FIG. 4, shown is a schematic block diagram of another example LED driving circuit. In this particular example, LED driving circuit A can include SCR dimmer TRIAC, bleeder circuit 1', controller 2', constant current control circuit 3', and rectifier circuit 4'. LED driving circuit A may further include a diode coupled to DC bus voltage and a filter capacitor coupled in parallel with an LED load. SCR dimmer TRIAC can connect between rectifier circuit 4' and an AC input terminal for chopping an input alternating current voltage. Rectifier circuit 4' can convert alternating current voltage to direct current voltage. Constant current control circuit 3' can coupled in series with the LED load, and a load current flowing through the LED load can be substantially constant and controllable by controlling transistor Q2 to operate in a linear region. Constant current control circuit 3' may include transistor Q2 and error amplifier EA2 for controlling transistor Q2.

Transistor Q2 can connect between the LED load and resistor R2. One terminal of resistor R2 can connect to a source of transistor Q2. The gate of transistor Q2 can connect to an output terminal of error amplifier EA2. One input terminal of error amplifier EA2 (e.g., the non-inverting input) can receive load current reference signal Ref2, and another input terminal of error amplifier EA2 (e.g., the inverting input) can be coupled to the source of transistor Q2. The voltage at the inverting input of error amplifier EA2 can represent the load current flowing through transistor Q2 due to a voltage drop across resistor R2, such that an output signal of error amplifier EA2 can vary along with the load current to form a current closed loop circuit. Transistor Q2 controlled by the output signal of error amplifier EA2 can adjust the load current flowing through transistor Q2 to be consistent with (e.g., the same as) load current reference signal Ref2.

Bleed circuit 1' can substantially be coupled in parallel with the LED load. Bleed circuit 1' may draw a bleed current from a DC bus voltage during the off-state of SCR dimmer TRIAC and when the DC bus voltage is less than predetermined load driving voltage VLED. In this example, bleeder circuit 1' can include transistor Q1 and resistor R1. Resistor R1 can connect between the source of transistor Q1 and one terminal of resistor R2 (e.g., away from ground). Transistor Q1 can connect between the DC bus voltage and resistor R1. Bleeder circuit 1' can be controlled by controller 2' to draw the bleed current. Controller 2' can include error amplifier EA1. Error amplifier EA1 can receive bleed reference signal Ref3 at its non-inverting input terminal, and the voltage at the high voltage terminal of resistor R2 at its inverting input terminal, and may generate a control signal to control the gate of transistor Q1.

For example, bleed reference signal Ref3 can correspond to holding current IL of SCR dimmer TRIAC. During the period when bus voltage VBUS is less than predetermined load driving voltage VLED, transistor Q2 may be turned off, and transistor Q1 can be turned on to operate in a linear region for bleeding. Bleeder circuit 1' can generate a bleed current greater than or equal to current IL until bus voltage VBUS is greater than load driving voltage VLED. When bus voltage VBUS is increased to be above load drive voltage VLED, transistor Q2 can be controlled to operate in a linear region to regulate load current ILED. Since the voltage at the inverting input terminal of error amplifier EA1 is larger than bleed current reference signal Ref1, the control signal generated by error amplifier EA1 can be negative to control transistor Q1 to be turned off. When bus voltage VBUS is decreased to be below load driving voltage VLED, transistor Q2 can be turned off and transistor Q1 turned on to enable the circuit to bleed again.

Figure 5:
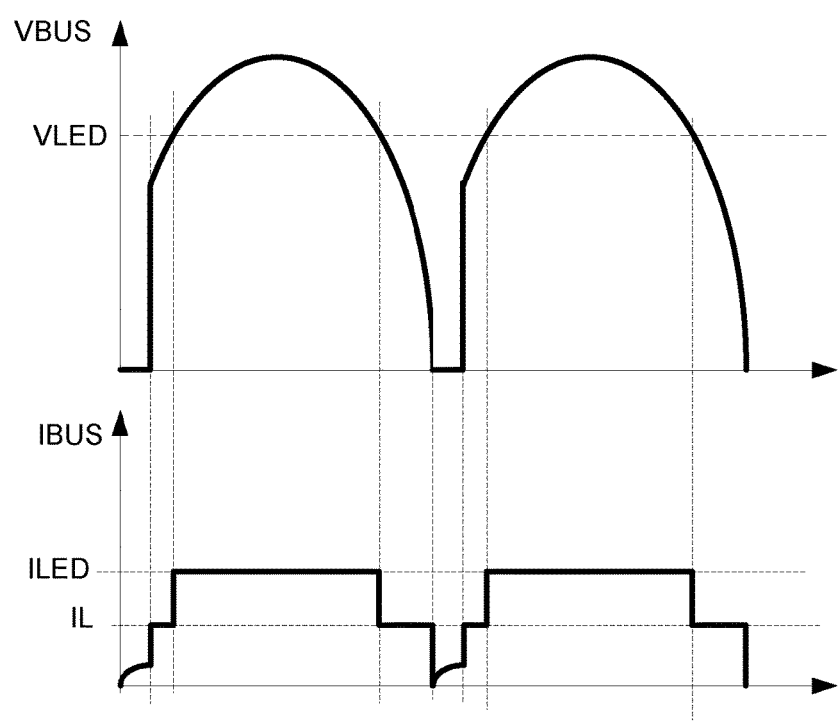
FIG. 5 is a waveform diagram of example operation of the circuit of FIG. 4.

Referring now to FIG. 5, shown is a waveform diagram of example operation of the circuit of FIG. 4. Transistor Q1 can draw a bleed current before SCR dimmer TRIAC is turned on, and bus voltage VBUS is pulled down to zero, which can improve the consistency of conduction angle of SCR dimmer TRIAC. However, this may also lead to conduction time of SCR dimmer TRIAC in advance, and decreased efficiency due to the bleed current before SCR dimmer TRIAC turning on.

In one embodiment, an apparatus can include: (i) a bleeder circuit coupled to a DC bus of an LED driving circuit having an SCR dimmer; (ii) the bleeder circuit being configured to stabilize a voltage of the DC bus at a predetermined value by drawing a bleed current through a bleed path in a first mode, and to cut off the bleed path in a second mode; and (iii) a controller configured to control the bleeder circuit to be in the first mode before the SCR dimmer is turned on, and to switch to the second mode after the SCR dimmer is turned on, where the predetermined value is greater than zero.

Figure 6:
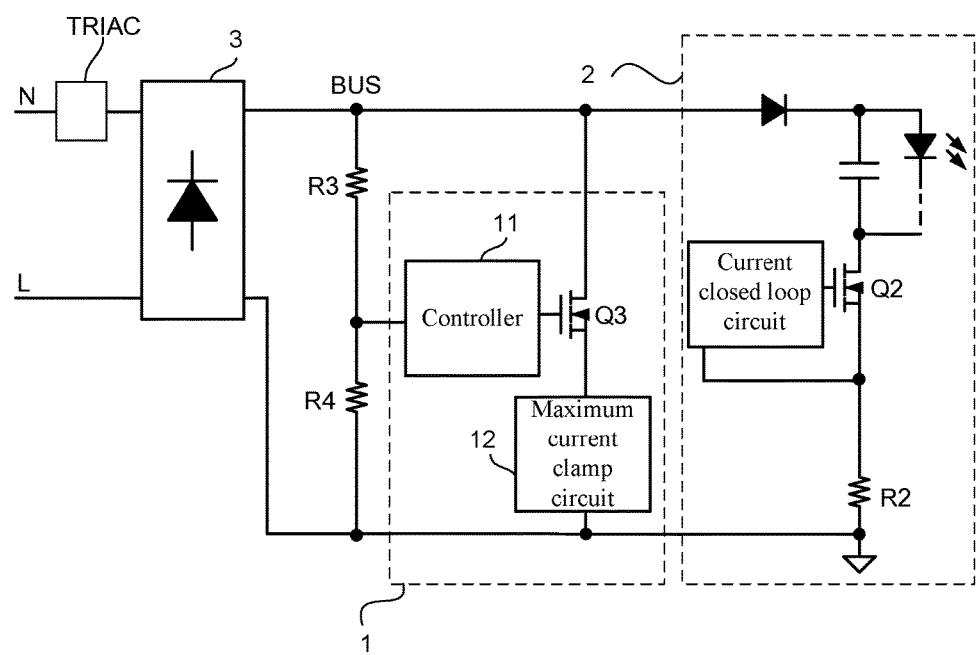
FIG. 6 is a schematic block diagram of an example LED driving circuit, in accordance with embodiments of the present invention.

Referring now to FIG. 6, shown is a schematic block diagram of an example LED driving circuit, in accordance with embodiments of the present invention. In this example, the LED driving circuit can include SCR dimmer TRIAC, apparatus 1 for providing a bleed current, constant current control circuit 2, and rectifier circuit 3. SCR dimmer TRIAC can connect between rectifier circuit 3 and an AC input terminal. Rectifier circuit 3 can convert alternating current voltage chopped by SCR dimmer TRIAC to direct current voltage. Constant current control circuit 2 can include transistor Q2, resistor R2, and a control loop circuit. Constant current control circuit 2 can detect the load current through resistor R2, and control the load current to be substantially constant through current closed loop circuit. Constant current control circuit 2 can integrate LED loads. In particular embodiments, the LED load can also be separated from the linear device and the control circuit of constant current control circuit 2. Furthermore, constant current control circuit 2 can also use multiple linear devices for constant current control, in order to achieve a wide range of load driving voltage.

Apparatus 1 can include a bleeder circuit and controller 11. The bleeder circuit coupled to DC bus voltage VBUS can be controlled to switch between first and second modes of operation. In the first mode, the bleeder circuit can be controlled to stabilized bus voltage VBUS at a non-zero predetermined value to be constant by drawing a bleed current through a bleed path. In the second mode, the bleeder circuit can be controlled to cut off the bleed path. The bleeder circuit can include transistor Q3. Transistor Q3 can operate in the linear region and may regulate DC bus voltage VBUS in accordance with a current at a control terminal. Those skilled in the art will recognize that a device or a circuit as a controlled voltage source can replace transistor Q3 in particular embodiments. For example, an insulated gate bipolar transistor IGBT or a more complicated circuit structure including a plurality of metal oxide semiconductor transistors can be utilized.

Controller 11 can control the bleeder circuit to operate in the first mode before SCR dimmer TRIAC is turned on, and to control the bleeder circuit to switch to the second mode after SCR dimmer TRIAC is turned on. The bleeder circuit controlled by controller 11 can draw the bleed current through the bleed path maintaining DC bus voltage VBUS constant, and may cut down the bleed path after SCR dimmer TRIAC is turned off. In this way, side effects of the conducting point of the SCR dimmer due to different leakage currents caused by different types of SCR dimmer and different circuit parameters may be substantially avoided. Furthermore, the predetermined value can ensure that DC bus voltage VBUS is slightly greater than a predetermined load driving voltage when SCR dimmer TRIAC is turned on, such that the LED load is turned on immediately after SCR dimmer TRIAC is turned on, which can maximize system efficiency.

Controller 11 can determine on state of SCR dimmer TRIAC by detecting a rising speed of DC bus voltage VBUS. Controller 11 can obtain bus voltage sampling signal SVBUS through a voltage dividing circuit that includes resistors R3 and R4 by detecting DC bus voltage VBUS. Controller 11 can cut off the bleeder circuit when SCR dimmer TRIAC is detected to be turned on, and constant current control circuit 2 can operate to drive the LED load by the bus current through the DC bus. When DC bus voltage VBUS is below a predetermined threshold, the state that the present period of DC bus voltage VBUS (e.g., at the end of the period) can be determined by controller 11, and then the bleeder circuit can be controlled to switch to the first mode and start to bleed again by controller 11.

The bleeder circuit can further include maximum current clamp circuit 12 connected in series with transistor Q3 and being configured to limit the maximum value of bleed current IQ3 flowing through transistor Q3. When bleed current IQ3 is less than clamp current IMAX, maximum current clamp circuit 12 may be at the on-state. When bleed current IQ3 is increased to clamp current IMAX, maximum current clamp circuit 12 can clamp bleed current IQ3 at clamp current IMAX. When SCR dimmer TRIAC is turned on, bleed current IQ3 can be increased to keep DC bus voltage VBUS to be constant. When bleed current IQ3 is increased to reach clamp current IMAX, DC bus voltage VBUS may begin to increase and vary along with the alternating current voltage generated by SCR dimmer TRIAC.

Figure 7:
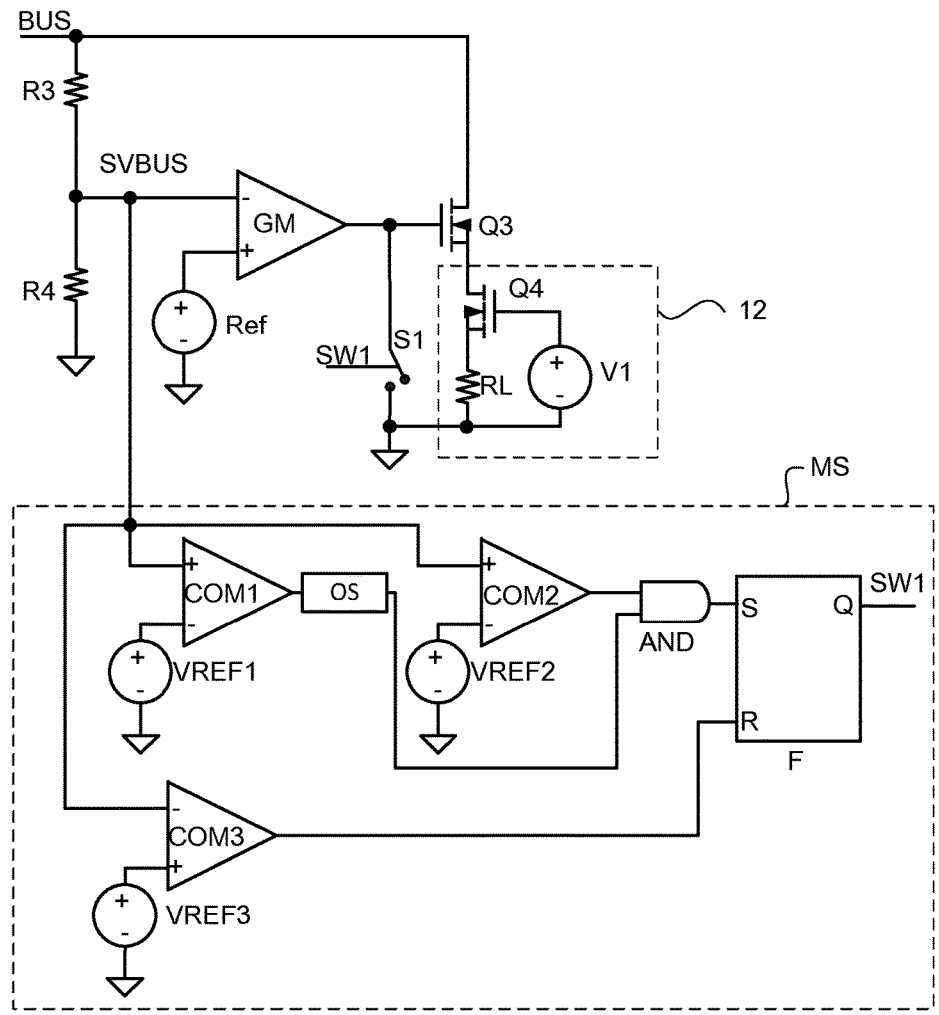
FIG. 7 is a schematic block diagram of example maximum current clamp and mode switching circuitry, in accordance with embodiments of the present invention.

Referring now to FIG. 7, shown is a schematic block diagram of example maximum current clamp and mode switching circuitry, in accordance with embodiments of the present invention. In this example, maximum current clamp circuit 12 can include transistor Q4, voltage source V1, and resistor RL. Transistor Q4 and resistor RL can connect in series in the bleed path for clamping the bleed current. Voltage source V1 can connect between the control terminal of transistor Q4 and ground. The bleed current flowing through transistor Q4 (e.g., equal to the bleed current through transistor Q3) can be clamped when the bleed current is increased to reach clamp current IMAX, where clamp current IMAX can be calculated by the following formula (1).

$$IMAX = \frac{(V1 - Q4\_th)}{RL} \qquad (1)$$

Here, Q4_th is the maximum gate-drain voltage drop of transistor Q4. In particular embodiments, maximum current clamp circuit 12 can also be implemented by other structures. Controller 11 can include transconductance amplifier GM, mode switch S1, and mode switching circuit MS. Transconductance amplifier GM can receive bus voltage sampling signal SVBUS at a first input terminal (e.g., the inverting terminal) and voltage reference signal Ref at a second input terminal (e.g., the non-inverting terminal), and may generate the control signal to control transistor Q3 for maintaining DC bus voltage VBUS as substantially constant. When the bleeder circuit is in the first mode, DC bus voltage VBUS can be calculated by the following formula (2).

$$VBUS = Ref \times \left(\frac{R3}{R4} + 1\right) \qquad (2)$$

DC bus voltage VBUS can be controlled to be consistent with (e.g., the same as) predetermined value CV by adjusting the voltage dividing ratio of the voltage dividing circuit without changing voltage reference signal Ref. Since apparatus 1 can be implemented by use of an integrated circuit, a reference voltage source for generating voltage reference signal Ref can be set in the integrated circuit, and resistors R3 and R4 may be configured as a peripheral circuit. Accordingly, DC bus voltage VBUS can be flexibly set as may be required by apparatus 1 in the first mode by adjusting resistors R3 and R4 in order to regulate the voltage dividing ratio.

Mode switch S1 coupled to an output terminal of transconductance amplifier GM, can be turned on or off to control the bleeder circuit to operate in the first mode or the second mode. Transistor Q3 controlled by a current at the control terminal as the control signal generated by transconductance amplifier GM can provide constant voltage control for DC bus voltage VBUS when mode switch S1 is turned off and the bleeder circuit is in the first mode. When mode switch S1 is turned on, the control terminal of transistor Q3 may be grounded, such that transistor Q3 is turned off, and the bleeder circuit is switched to the second mode.

Mode switching circuit MS can generate a control signal for controlling mode switch S1. Mode switching circuit MS can control mode switch S1 to be turned on when bus voltage sampling signal SVBUS is increased from threshold VREF1 to threshold VREF2 within a predetermined time, and control mode switch S1 to be turned off when bus voltage sampling signal SVBUS is decreased to be below threshold VREF3. Mode switching circuit MS can include comparators COM1-COM3, single pulse trigger circuit OS, AND-gate AND, and RS flip-flop F. Comparator COM1 can compare bus voltage sampling signal SVBUS against threshold VREF1, and may generate a high level when bus voltage sampling signal SVBUS is increased to be above threshold VREF1.

Single pulse trigger circuit OS can generate a pulse signal for a predetermined time in response to the rising edge of the output signal of comparator COM1. Comparator COM2 can compare bus voltage sampling signal SVBUS against threshold VREF2, and may generate a high level when bus voltage sampling signal SVBUS is increased to be above threshold VREF2. AND-gate AND having two input terminals coupled respectively to output terminals of single pulse trigger circuit OS and comparator COM2 can generate a high level when both of the input terminals are high levels. In addition, both of thresholds VREF1 and VREF2 may be set to be greater than voltage reference signal Ref. Predetermined value CV corresponding to voltage reference signal Ref can be calculated by the following formula (3).

$$CV = Ref*(R3+R4)/R4 \quad (3)$$

Threshold VREF2 may be greater than threshold VREF1 such that AND-gate AND can generate a high level when bus voltage sampling signal SVBUS is increased to be greater than threshold VREF2 from threshold VREF1 within a predetermined time. Comparator COM3 can compare bus voltage sampling signal SVBUS against threshold VREF3, and may generate a high level when bus voltage sampling signal SVBUS is less than threshold VREF3. RS flip-flop F having a set terminal coupled to an output terminal of AND-gate AND, and a reset terminal coupled to an output terminal of comparator COM3, can control mode switch S1 to be turned on or off. Mode switching circuit MS can generate a high level to control mode switch S1 to be turned on when DC bus voltage VBUS is increased rapidly, and generate a low level to control mode switch S1 to be turned off when DC bus voltage VBUS is decreased to be below a predetermined threshold corresponding to threshold VREF3, where predetermined threshold VREF3' can be calculated by the following formula (4).

$$VREF3' = VREF3*(R3+R4)/R4 \quad (4)$$

For example, predetermined threshold VREF3' corresponding to threshold VREF3 can be set to be less than predetermined value CV. Those skilled in the art will recognize that the connection relationships and configuration of the circuitry can be modified to achieve the same or similar functionality by adopting other logic circuit structures in certain embodiments.

Figure 8:
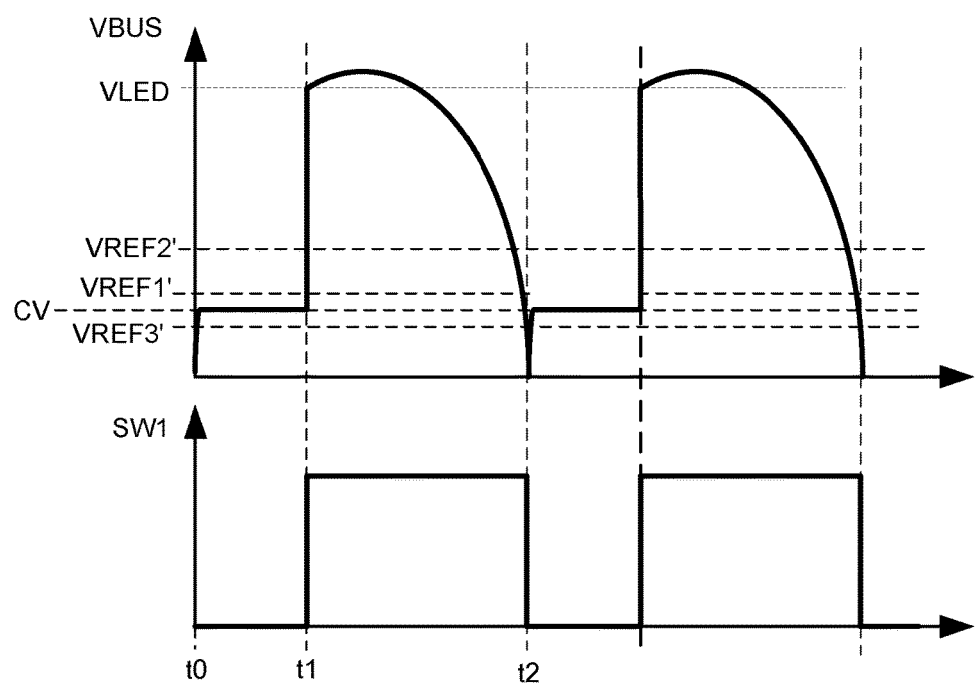
FIG. 8 is a waveform diagram of example operation of the circuit of FIG. 6, in accordance with embodiments of the present invention.

Referring now to FIG. 8, shown is a waveform diagram of example operation of the circuit of FIG. 6, in accordance with embodiments of the present invention. Here, VREF1'-VREF3' respectively refer to DC bus voltage VBUS corresponding to threshold VREF1 to threshold VREF3. At time t0, control signal SW1 is low, and mode switch S1 may be turned off such that transistor Q3 can maintain DC bus voltage VBUS to be substantially constant, which is slightly greater or less than predetermined value CV in response to the current at the control terminal generated by transconductance amplifier GM until time t1. At time t1, while SCR dimmer TRIAC is turned on, the bleed current may be clamped in a relatively short time, and DC bus voltage VBUS may rapidly increase. After detecting that SCR dimmer TRIAC is turned on, mode switching circuit MS can control mode switch S1 to be turned on, and the control terminal of transistor Q3 may be grounded, such that transistor Q3 is turned off to cut off the bleed path, and the bleeder circuit can switch from the second mode to the first mode to achieve bleeding again.

DC bus voltage VBUS can be slightly greater than predetermined load driving voltage VLED with the bleeder circuit when SCR dimmer TRIAC being turned on, such that the bus current through the DC bus can flow to the LED load and constant current control circuit 2 can drive the LED load to be turned on. At time t2, DC bus voltage VBUS can decrease to be below voltage VREF3', such that mode switching circuit MS can control mode switch S1 to be turned off, and the bleeder circuit may switch from the second mode to the first mode. In this example, DC bus voltage VBUS can be controlled to be constant before SCR dimmer TRIAC is turned on, in order to ensure that side effects of conducting point of the SCR dimmer due to different leakage currents that may be caused by different types of SCR dimmer and different circuit parameters, can be substantially avoided, and the voltage of the SCR dimmer after being turned on can be determined in accordance with the constant predetermined value of DC bus voltage VBUS.

Figure 9:
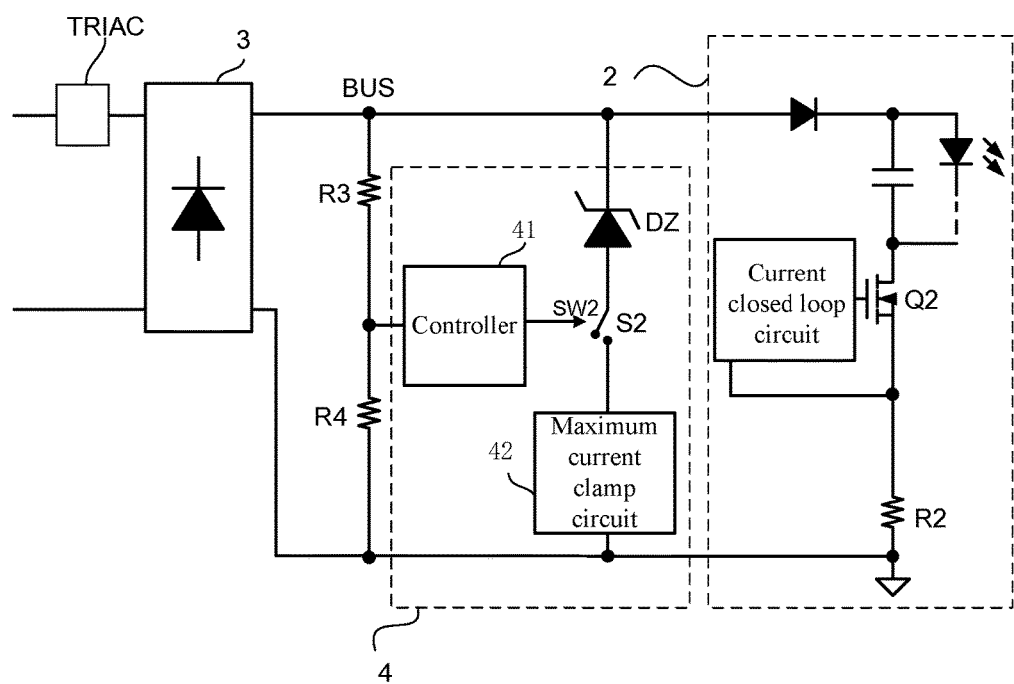
FIG. 9 is a schematic block diagram of another example LED driving circuit, in accordance with embodiments of the present invention.

Referring now to FIG. 9, shown is a schematic block diagram of another example LED driving circuit, in accordance with embodiments of the present invention. In this example, LED driving circuit can include SCR dimmer TRIAC, apparatus 4 for bleeding constant current control circuit 2, and rectifier circuit 3. SCR dimmer TRIAC can connect between an AC input terminal and the rectifier circuit. Rectifier circuit 3 can convert alternating current voltage to direct current voltage. Constant current control circuit 2 can include transistor Q2, resistor R2 and control loop circuit. The constant current control can be achieved based on the current closed loop circuit by detecting the load current though resistor R2 to maintain the current flowing through the LED load to be substantially constant. Circuit 4 for bleeding can include a bleeder circuit and controller 41. The bleeder circuit can connect between DC bus voltage VBUS and ground, and may be controlled to switch between the first mode and the second mode.

The bleeder circuit can include Zener diode DZ, bleed switch S2, and maximum current clamp circuit 42 coupled in series to receive DC bus voltage VBUS. A Zener diode is a diode that can operate on the principle that the current in the reverse breakdown state of a PN junction can be varied over a wide range while the voltage is essentially constant. The cathode of Zener diode DZ can connect to DC bus voltage VBUS, and the anode can connect to bleed switch S2. Bleed switch S2 can be controlled by control signal SW2 to be turned on or off. In the first mode, bleed switch S2 can be turned on, and when Zener diode DZ is broken down by DC bus voltage VBUS, DC bus voltage VBUS can be controlled to be constant, the bleed current in bleed path can vary over a wide range, and can be controlled to be below clamp current IMAX.

In the second mode, bleed switch S2 can be turned off, and the bleed path may be cut off. In this example, while maintaining bus voltage VBUS as substantially constant, the bleed circuit can draw the bleed current through Zener diode DZ without constant voltage control, and controller 41 may be utilized to control bleed switch S2 to be turned on or off for mode switching. Bleed switch S2 can be a controllable switching device, such as a metal oxide semiconductor transistor (MOSFET), or an insulated gate semiconductor transistor (IGBT).

Controller 41 can control the bleeder circuit to be in the first mode by controlling bleed switch S2 to be in the on-state before detecting that SCR dimmer TRIAC is turned on, and to control the bleeder circuit to be in the second mode by controlling bleed switch S2 to be off-state after SCR dimmer TRIAC is turned on. For example, controller 41 can control bleed switch S2 to be turned off when bus voltage sampling signal SVBUS is increased from threshold VREF1 to threshold VREF2 within a predetermined time period when bus voltage sampling signal SVBUS is decreased to less than threshold VREF3, mode switch S1 can be controlled to be turned off. Controller 41 may detect DC bus voltage VBUS by the voltage dividing circuit composed of resistors R3 and R4 in order to obtain bus voltage sampling signal SVBUS. Since the breakdown voltage of Zener diode DZ can directly affect DC bus voltage VBUS, DC bus voltage VBUS can be controlled to be slightly greater than predetermined load drive voltage VLED to meet supply voltage requirements of turn-on operation for different types of SCR dimmers, in order to immediately light the LED load after the SCR dimmer turns on.

Figure 10:
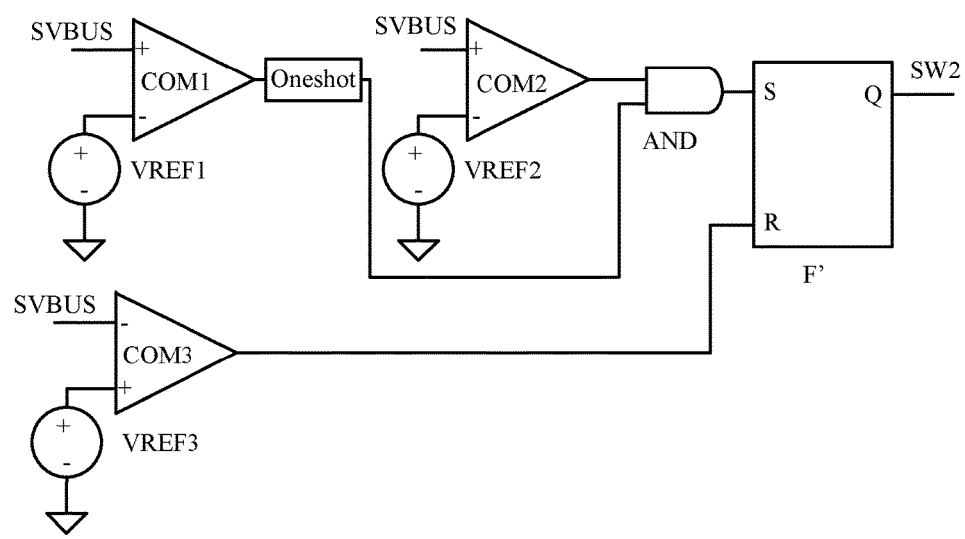
FIG. 10 is a schematic block diagram of an example controller of FIG. 9, in accordance with embodiments of the present invention.

Referring now to FIG. 10, shown is a schematic block diagram of an example controller of FIG. 9, in accordance with embodiments of the present invention. Controller 41 can include comparators COM1-COM3, single pulse trigger circuit "Oneshot," AND-gate AND, and RS flip-flop F'. Comparator COM1 can compare bus voltage sampling signal SVBUS against threshold VREF1, and may generate a high level when bus voltage sampling signal SVBUS is increased to be above threshold VREF1. Single pulse trigger circuit Oneshot can generate a pulse signal for a predetermined time in response to the rising edge of the output signal of comparator COM1. Comparator COM2 can compare bus voltage sampling signal SVBUS against threshold VREF2, and may generate a high level when bus voltage sampling signal SVBUS is increased to be above threshold VREF2. AND-gate AND having input terminals coupled respectively to the output terminals of single pulse trigger circuit Oneshot and comparator COM2 can generate a high level when both of the input terminals are high levels.

DC bus voltages VREF1' and VREF2' corresponding to threshold VREF1 and threshold VREF2 may both be set to be greater than breakdown voltage VZ of Zener diode DZ, and breakdown voltage VZ can be equal to the predetermined value of DC bus voltage VBUS. Threshold VREF2 may be greater than threshold VREF1 such that AND-gate AND can generate a high level when bus voltage sampling signal SBUS is increased to be greater than threshold VREF2 from threshold VREF1 within a predetermined time. Comparator COM3 can compare bus voltage sampling signal SVBUS against threshold VREF3, and may generate a high level when bus voltage sampling signal SVBUS is less than threshold VREF3.

RS flip-flop F' having a set terminal S connected to the output terminal of AND-gate AND, and output terminal connected to the control terminal of mode switch S1 can control mode switch S2 to be turned on or off. The output terminal of comparator COM3 can connect to a reset terminal R of RS flip-flop F', such that mode switching circuit MS can generate a low level to control mode switch S2 to be turned off when bus voltage VBUS is decreased to be below predetermined threshold VREF3', where predetermined threshold VREF3' corresponding to threshold VREF3 can be calculated by the following formula (5).

$$VREF3' = VREF3*(R3+R4)/R4 \quad (5)$$

For example, predetermined threshold VREF3' corresponding to threshold VREF3 can be set to be less than predetermined value VZ. When DC bus voltage VBUS is decreased to be below predetermined threshold VREF3', the half period of the AC input may end.

Figure 11:
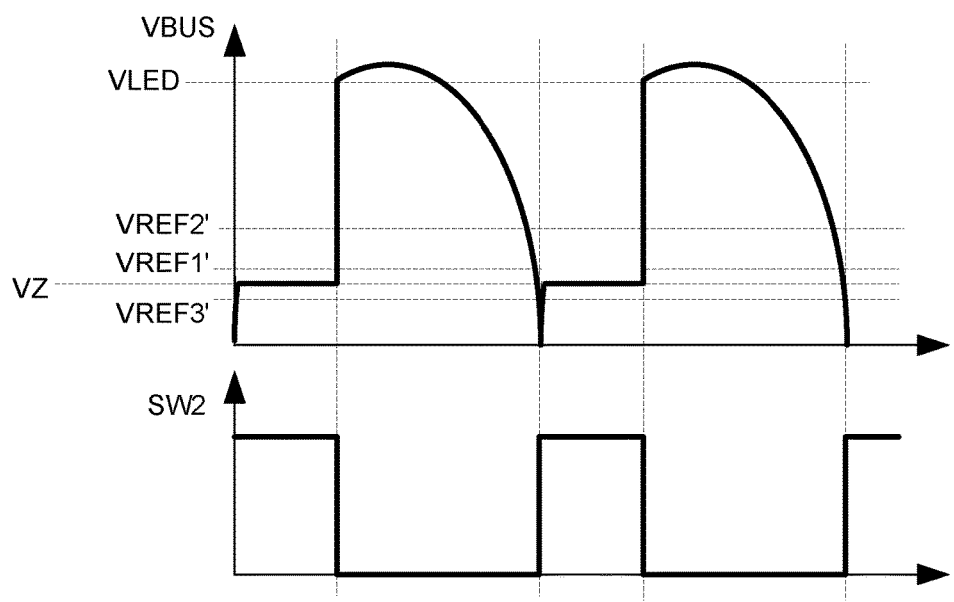
FIG. 11 is a waveform diagram of example operation of the circuit of FIG. 9, in accordance with embodiments of the present invention.

Referring now to FIG. 11, shown is a waveform diagram of example operation of the circuit of FIG. 9, in accordance with embodiments of the present invention. Here, VREF1'-VREF3' can respectively refer to bus voltage VBUS corresponding to threshold VREF1 to threshold VREF3. At time t0, control signal SW2 is high, and mode switch S2 may be turned on, such that Zener diode DZ can be broken down by DC bus voltage VBUS to maintain DC bus voltage VBUS to be substantially constant, which is slightly greater or less than breakdown voltage VZ, until time t1. At time t1, while SCR dimmer TRIAC is turned on, the bleed current may be clamped in a relatively short time, and DC bus voltage VBUS may rapidly increase. After detecting that SCR dimmer TRIAC is turned on, controller 41 can control mode switch S2 to be turned off, which may cut off the bleed path. DC bus voltage VBUS can be slightly larger than predetermined load driving voltage VLED with the bleeder circuit when SCR dimmer TRIAC is on, such that the bus current through the DC BUS can flow to the LED load, and constant current control circuit 2 can drive the LED load to be turned on. At time t2, DC bus voltage VBUS may decrease to be below voltage VREF3', such that controller 41 can control mode switch S2 to be turned on, and the bleeder circuit may switch from the second mode to the first mode to achieve bleeding again.

Figure 12:
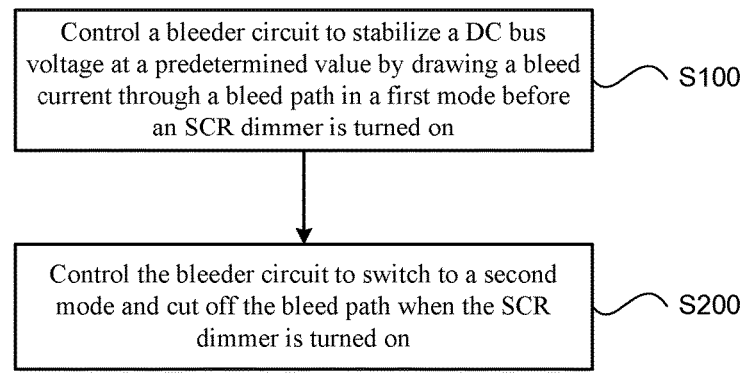
FIG. 12 is a flow diagram of an example control method, in accordance with embodiments of the present invention.

Referring now to FIG. 12, shown is a flow diagram of an example control method, in accordance with embodiments of the present invention. In this example, at S100, the bleed circuit can be controlled to stabilize a DC bus voltage at a predetermined value by drawing a bleed current through a bleed path in a first mode before the SCR dimmer is turned on. Alternatively, the bleeder circuit may control DC bus voltage to be constant in a controlled manner in the first mode, and may also control DC bus voltage to be constant in an uncontrolled manner. For example, the DC bus voltage can be set to be constant at a predetermined value such that the DC bus voltage can be slightly larger than a predetermined load drive voltage when the SCR dimmer is turned on.

At S200, the bleeder circuit can be controlled to switch to a second mode, and to cut off the bleed path when the SCR dimmer is turned on. For example, the DC bus voltage can be increased rapidly by limiting the maximum value of the bleed current when the SCR dimmer is turned on. As a result, with the bleed current being clamped, the bus voltage can rise rapidly, such that the conduction position of the SCR dimmer can be determined in accordance with the DC bus voltage. Further, the detection of the on state of SCR dimmer may be determined in accordance with a rising speed of the DC bus voltage, and the bleeder circuit can be controlled to switch to the first mode upon detecting that the DC bus voltage has decreased below a predetermined threshold. In this example, the bus voltage may be stabilized at a predetermined value by a bleeder circuit before the SCR dimmer is turned on, and influence on the conducting point of SCR dimmer may be substantially avoided due to different leakage currents that may be caused by different types of SCR dimmers and circuit settings.

It should be understood that although the above describes that the controller is constructed using analog circuitry, those skilled in the art can understood that the controller can additionally or alternatively be constructed by using a digital circuitry and a digital-to-analog/digital conversion device(s). The digital circuitry may be can be implemented in one or more dedicated circuit blocks (ASICs), digital signal processors (DSPs), digital signal processing devices (DSPDs), programmable logic devices (PLDs), field programmable gate arrays (FPGAs), processors, controllers, microcontrollers, microprocessors, or other electronic units or combinations thereof configured to perform the circuit functions as described herein. Particular embodiments may also be implemented with hardware in combination with firmware or software implementations (e.g., procedures, functions, etc.) that can perform various functions as described herein, whereby such software/code can be stored in memory and executed by a processor, whereby the memory may be implemented within the processor or outside the processor.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An apparatus, comprising:
    a) a bleeder circuit coupled to a DC bus of a light-emitting diode (LED) driving circuit having a silicon-controlled rectifier (SCR) dimmer;
    b) a mode switch coupled to said bleeder circuit, and being configured to control said bleeder circuit to operate in a first mode or a second mode;
    c) wherein said bleeder circuit is configured to stabilize a voltage of said DC bus at a predetermined value by drawing a bleed current through a bleed path in said first mode, and to cut off said bleed path in said second mode; and
    d) a controller comprising said mode switch, and being configured to control said bleeder circuit to be in said first mode before said SCR dimmer is turned on, and to switch to said second mode after said SCR dimmer is turned on, wherein said predetermined value is greater than zero.

2. The apparatus of claim 1, wherein said predetermined value is configured such that said DC bus voltage is greater than a predetermined load driving voltage when said SCR dimmer is turned on.

3. The apparatus of claim 1, wherein said controller is configured to determine an on state of said SCR dimmer by detecting a rising speed of said DC bus voltage.

4. The apparatus of claim 1, wherein said controller is configured to control said bleeder circuit to switch to said first mode when said DC bus voltage is below a predetermined threshold.

5. The apparatus of claim 1, wherein said bleeder circuit comprises a transistor having two power terminals coupled to two terminals of said DC bus, said transistor being configured to regulate said DC bus voltage in accordance with a signal at a control terminal of said transistor.

6. The apparatus of claim 5, wherein said bleeder circuit further comprises a maximum current clamp circuit coupled in series with said transistor, and being configured to limit a maximum value of said bleed current.

7. The apparatus of claim 1, wherein said controller comprises a transconductance amplifier configured to receive a voltage reference signal at a first input terminal, and a bus voltage sampling signal at a second terminal, and to generate a control signal at an output terminal that is coupled to said mode switch.

8. The apparatus of claim 7, wherein said mode switch is coupled between said output terminal of said transconductance amplifier and ground.

9. The apparatus of claim 7, wherein said apparatus further comprises a voltage dividing circuit configured to divide said DC bus voltage, and to generate said bus voltage sampling signal, said DC bus voltage being greater than said predetermined load driving voltage by adjusting a voltage dividing ratio of said voltage dividing circuit when said SCR dimmer is turned on.

10. The apparatus of claim 9, wherein said predetermined value is configured to be regulated by adjusting said voltage dividing ratio.

11. The apparatus of claim 7, wherein said controller further comprises a mode switching circuit configured to turn on said mode switch when said bus voltage sampling signal is increased from a first threshold to a second threshold within a predetermined time, and to turn off said mode switch when said bus voltage sampling signal is decreased to be below a third threshold.

12. The apparatus of claim 11, wherein said mode switching circuit comprises:
    a) a first comparator configured to compare said bus voltage sampling signal against said first threshold;
    b) a single pulse trigger circuit configured to generate a pulse signal for a predetermined time in response to an output signal of said first comparator;
    c) a second comparator configured to compare said bus voltage sampling signal against said second threshold;
    d) an AND-gate having two input terminals coupled to output terminals of said single pulse trigger circuit and said second comparator;
    e) a third comparator configured to compare said bus voltage sampling signal against said third threshold; and
    f) a RS flip-flop having a set terminal coupled to an output terminal of said AND-gate, a reset terminal coupled to an output terminal of said third comparator, and an output terminal coupled to a control terminal of said mode switch, wherein said first threshold is greater than said second threshold, and said second threshold is greater than said third threshold.

13. The apparatus of claim 1, wherein said bleeder circuit comprises:
    a) a Zener diode; and
    b) a bleed switch, wherein said Zener diode, said bleed switch, and said maximum current clamp circuit are coupled in series to receive said DC bus voltage, and said bleed switch is configured to control said bleeder circuit to operate in said first mode or said second mode.

14. The apparatus of claim 13, wherein said controller is configured to turn off said bleed switch when a bus voltage sampling signal is increased from a first threshold to a second threshold within a predetermined time, and to turn on said bleed switch when said bus voltage sampling signal is decreased to be below a third threshold.

15. The apparatus of claim 14, wherein said controller comprises:

a) a first comparator configured to compare said bus voltage sampling signal against said first threshold;
b) a single pulse trigger circuit configured to generate a pulse signal for a predetermined time in response to an output signal of said first comparator;
c) a second comparator configured to compare said bus voltage sampling signal against said second threshold;
d) an AND-gate having input terminals coupled to output terminals of said single pulse trigger circuit and said second comparator;
e) a third comparator configured to compare said bus voltage sampling signal against said third threshold; and
f) a RS flip-flop having a set terminal coupled to an output terminal of said AND-gate, a reset terminal coupled to an output terminal of said third comparator, and an output terminal coupled to a control terminal of said bleed switch, wherein said first threshold is greater than said second threshold, and said second threshold is greater than said third threshold.

16. The apparatus of claim 13, wherein said DC bus voltage is made greater than a predetermined load driving voltage by adjusting a breakdown voltage of said Zener diode when said SCR dimmer is turned on.

17. The apparatus of claim 16, wherein said predetermined value is regulated by adjusting said breakdown voltage of said Zener diode.

18. A method of controlling a bleeder circuit coupled to a DC bus of a light-emitting diode (LED) driving circuit having a silicon-controlled rectifier (SCR) dimmer, the method comprising:
a) controlling, by a mode switch coupled to said bleeder circuit, said bleeder circuit to operate in a first mode or a second mode;
b) stabilizing, by said bleeder circuit, a voltage of said DC bus at a predetermined value by drawing a bleed current through a bleed path in said first mode;
c) cutting off, by said bleeder circuit, said bleed path in said second mode; and
d) controlling said bleeder circuit to be in said first mode before said SCR dimmer is turned on, and to switch to said second mode after said SCR dimmer is turned on, wherein said predetermined value is greater than zero.

19. The method of claim 18, wherein said predetermined value is configured such that said DC bus voltage is greater than a predetermined load driving voltage.

20. The method of claim 19, wherein said DC bus voltage is rapidly increased when said SCR dimmer is turned on by limiting the maximum value of said bleed current.

* * * * *